United States Patent [19]

Teuber et al.

[11] Patent Number: 5,472,150
[45] Date of Patent: Dec. 5, 1995

[54] BALANCED REEL HUB FOR TAPE CASSETTE REELS

[75] Inventors: Vincent P. Teuber, Hastings; Jeffrey T. Gibbs, Breckenridge, both of Minn.

[73] Assignee: Minnesota Mining and Manufacturing Company, St. Paul, Minn.

[21] Appl. No.: 201,667

[22] Filed: Feb. 25, 1994

[51] Int. Cl.[6] .......................... B65H 75/14; B65H 75/28
[52] U.S. Cl. .................. 242/345; 242/586.2; 242/613
[58] Field of Search .................. 242/610.4, 586.2, 242/606, 609, 610, 613, 613.4, 905, 345

[56] References Cited

U.S. PATENT DOCUMENTS

| | | | |
|---|---|---|---|
| 3,190,574 | 6/1965 | Purzycki | 242/613 |
| 3,485,456 | 12/1969 | Weyrich et al. | 242/71.8 |
| 3,921,927 | 11/1975 | Esashi et al. | 242/586.2 |
| 4,184,650 | 1/1980 | Nelson et al. | 242/71.8 |
| 4,254,919 | 3/1981 | Moodie | 242/609 |
| 4,293,102 | 10/1981 | Niles et al. | 242/613 |
| 4,387,864 | 6/1983 | Posso | 242/606 |
| 4,403,749 | 9/1983 | Nakagawa | 242/71.8 |
| 4,664,328 | 5/1987 | Yamada | 242/71.8 |
| 4,753,397 | 6/1988 | Nelson | 242/586.2 |
| 4,807,826 | 2/1989 | Iwahashi | 242/71.8 |
| 5,167,378 | 12/1992 | Johanson | 242/586.2 |
| 5,181,153 | 1/1993 | Nishimura | 360/132 |

FOREIGN PATENT DOCUMENTS

| | | |
|---|---|---|
| 0104472 | 4/1984 | European Pat. Off. . |
| 0140635 | 5/1985 | European Pat. Off. . |
| 0293993 | 12/1988 | European Pat. Off. . |
| 0376569 | 7/1990 | European Pat. Off. . |
| 0577008A2 | 1/1994 | European Pat. Off. . |
| 2488029 | 2/1982 | France . |
| 3108584A1 | 1/1982 | Germany . |
| 3108585A1 | 2/1982 | Germany . |
| 4004675A1 | 8/1991 | Germany . |

Primary Examiner—Daniel P. Stodola
Assistant Examiner—William A. Rivera
Attorney, Agent, or Firm—Gary L. Griswold; Walter N. Kirn; Charles D. Levine

[57] ABSTRACT

A videocassette tape reel hub includes an outer cylinder having a receptacle formed as a recessed portion of the outer surface on the inside of the outer cylinder. A clamp is receivable in the receptacle to fasten tape to the reel hub. A balancing mass is formed within the outer cylinder to balance the increased mass of the clamp and receptacle.

22 Claims, 3 Drawing Sheets

BALANCED REEL HUB FOR TAPE CASSETTE REELS

TECHNICAL FIELD

The present invention relates to tape reel hubs. More particularly, the present invention relates to tape reel hubs for use in videocassettes.

BACKGROUND OF THE INVENTION

A convenient and popular means for storing and using magnetic recording tape is the two-reel cassette, in which a length of magnetic tape is stored on a supply reel, with the free end of the roll of stored tape threaded over a tape path defined by a series of tape guides, to a takeup reel. The ends of the recording tape are typically attached to the reels through lengths of film, called leaders, having a width similar to that of the tape. One end of each leader is attached to an end of the magnetic tape and the free end of each leader is secured to the hub of a respective reel to enable the magnetic tape to be wound onto the takeup reel while being unwound from the supply reel.

The leader is clamped to the hub in a manner to sufficiently robust to enable the leader to withstand the relatively high tensile forces which are likely to be applied to it in use, without detaching from the reel hub.

The supply reel, takeup reel, and the tape guides are contained in a cassette housing, which can be inserted into a playing or recording apparatus (VCR) for recording or playback of the tape. Examples of magnetic tape cassettes are VHS and 8 mm video cassettes, which are popular for home use, D2, D3, and Betacam cassettes, which are often used in professional studio work.

Videocassette reels typically include two opposing flanges connected by a hub. Usually, the lower flange and the hub are molded as a single piece and the upper flange is molded separately and is attached to the hub before the hub is inserted into the cassette housing and before any tape is wound on or connected to the reel. These configurations apply to many different format videocassettes. Some examples of tape reels are shown in Iwahashi U.S. Pat. Nos. 4,807,826, Nakagawa 4,403,749, and Nelson et al. 4,184,650.

Known tape reels have clamping devices for fastening the tape to the reel. As shown in FIG. 1, an opening 12 is formed in the hub 10 of the tape reel. One leader is placed into the opening 12 and a tape locking piece, such as a clamp 14, is pushed into the opening 12 to fasten the tape to the hub 10.

The bottom of the hub 10 is open to create a receptacle for receiving and engaging a VCR drive spindle. A top view of the hub 10 reveals an outer cylinder 18, which forms the tape winding surface 20, and an inner structure such as an inner cylinder 22. The inner cylinder 22 is closed and forms the drive spindle receptacle. The top surface 24 of the inner cylinder 22 can serve as at least part of a connection point for the upper flange. A plurality of ribs 26 and posts 28 can be formed inside of the outer cylinder 18 for strength and to improve moldability. The inner cylinder 22 can be connected to the outer cylinder 18 via some of the ribs 26.

A feature which contributes to high levels of cassette noise is the use of pressure buttons which pass through the top cassette wall to apply a downward axial force to the centers of the reels. Pressure buttons of this type are disclosed in U.S. Pat. No. 5,181,153, which shows cassettes of both the Betacam and digital video type.

Means for reducing cassette noise from various sources are known. Reduction of noise at high tape transport rates caused by tape guide rollers are disclosed in published German Patent Application No. DE 4 004 675. In this reference, two guide rollers, called deflection rollers, have internal bores having a convex shape, and the ends of the bores provide projections beyond the end faces of the rollers. Published French Patent Application No. FR 2 488 029 discloses tape cassette reels in which the resin used in their production includes graphite, presumably to reduce friction, and hence, noise and wear.

The inventors have found that a significant portion of high speed transport noise generated by cassettes having sliding reel pressure buttons is caused by vibration resulting from unbalance of the reels.

Reels used in magnetic tape cassettes are inherently unbalanced. Due to the additional material used to form the structure surrounding the clamp-receiving opening, and due to the higher density material used for the clamp, the side of the hub that receives the clamp is heavier than the other side. The hub is unbalanced. This problem is inherent in the patented reels described above. In the Betacam Large SP format, for example, the center of mass of the hub is offset from the axis of rotation toward the clamp by approximately 0.025 cm (0.010 inch). Tape reels which do not use any clamping device to hold the end of a magnetic tape onto the hub can be inherently balanced, simply because of the rotational symmetry of the reel, but these reels do not provide the means for secure clamping which is needed in many magnetic tape cassette reels.

An example of a clamping device for a reel hub is disclosed in FIG. 1 of U.S. Pat. No. 4,807,826, in which the hub surface 11 has a gap 30 for inserting a clamp 31. U.S. Pat. No. 4,664,328 discloses a hub configuration in which the hub has a relatively thin cylindrical wall. A structure 13 provides adequate strength to the tape clamping gap in this hub, and the mass of the structure 13 contributes to the overall unbalance of the reel.

In addition to the unbalance contributed by the structure surrounding the tape gap, the tape clamp itself can add unbalanced mass, due to its material requirements. A typical material for a cassette tape reel is ABS or injection molded high impact polystyrene (HIPS). This material has been found to be unsatisfactory for the tape clamp, however, due to its lack of stiffness and strength. It has been found that a much better material for the tape clamp is acetal, an example of which is Delrin, available from E.I. DuPont de Nemours and Company. The specific gravity of a typical grade of Delrin is about 1.42, while the specific gravity of a typical HIPS is about 1.03. A typical tape clamp for a hub for 0.5 inch wide tape for use in a Betacam cassette weighs about 0.25 grams, which is 0.07 grams more than it would weigh if made from HIPS. This added weight at a localized area on one side of the hub further contributes to unbalance of the overall reel.

During fast winding, such as in the fast forward and rewind modes of operation and during factory winding, the weight and mass imbalance causes the hub to rotate with an eccentric motion around the axis of rotation. This causes vibration and uneven winding of the tape on the hub, and can lead to edge damage on the tape. Also, in cassette configurations that use reel pressure buttons to apply a pressure to the top center of the reel, the wobble vibration of the reel vibrates the pressure button. These vibrations, which are also transferred to the cover and base of the cassette, create undesirable noise as the cassette functions in a VCR.

Because the walls of cassettes are relatively thin compared to the length and width of the cassette, cassette walls tend to act as sounding boards to produce significant noise levels from even low levels of vibration.

No known cassette reels address this balance problem. None of the art suggests that balancing of magnetic tape cassette reels would be useful in reducing acoustic noise generated by cassettes, nor does any of the art suggest a way to produce mechanically balanced magnetic tape reels by injection molds, while retaining satisfactory dimensional tolerances and reel quality.

SUMMARY OF THE INVENTION

A videocassette tape reel hub according to the present invention can be located between two flanges to form a reel, which can be placed in a housing to form a videocassette. The hub includes an outer cylinder which has an outer surface which forms a tape winding surface. The outer cylinder extends from the lower flange at the bottom, and has a top which can be connected to the upper flange. The outer cylinder has a receptacle formed as a recessed portion of the outer surface on the inside of and as part of the outer cylinder.

An inner structure can extend from the plane of the lower flange at the bottom and has a top which can be connected to the upper flange. At least one first rib extends between the inner structure and the outer cylinder inside of the outer cylinder and at least one second rib extends between the inner structure and outer cylinder inside of the outer cylinder.

A balancing mass is formed on at least one the first rib generally opposite the receptacle. The balancing mass can be integrally molded as part of the first rib, can be capsule-shaped, and can be centered on the first rib. The balancing mass can have a major axis generally perpendicular to that of the rib, or the balancing mass can be formed as a thicker portion of the first rib having a major axis generally coaxial with that of the rib. It is important that the added masses be symmetrically located to shift the center of mass along the hub diameter, toward the axis of hub rotations. A clamp can be received in the receptacle to fasten tape to the reel hub.

DETAILED DESCRIPTION

This invention involves mechanically balancing reels in a magnetic tape cassette to reduce the vibration generated by the reels during high speed rotation, thereby reducing the level of acoustic noise generated by magnetic tape cassettes during fast winding, in either direction, of the tape. The invention is especially applicable to cassettes in which axial force is applied to the reels through sliding pressure buttons passing through the top wall or window of the cassette. These cassettes can be particularly prone to generating bothersome levels of noise during high speed tape transport.

The balanced reel hub of the present invention reduces and minimizes vibrations as the reel rotates during use, thereby reducing the tendency of uneven tape winds and tape edge damage. Reducing vibration enables cassettes to be wound in the factory at higher speeds. Balancing the hub reduces the noise generated during operation of the cassette in a VCR. Tests have shown a noise peak reduction measured inside the cassette, during fast forward and rewind modes, of between 3 dB and 6 dB at 630 Hz, the primary frequency for the noise caused by imbalanced hub wobbling. The noise level perceived by the user is significantly reduced.

Figure 1:
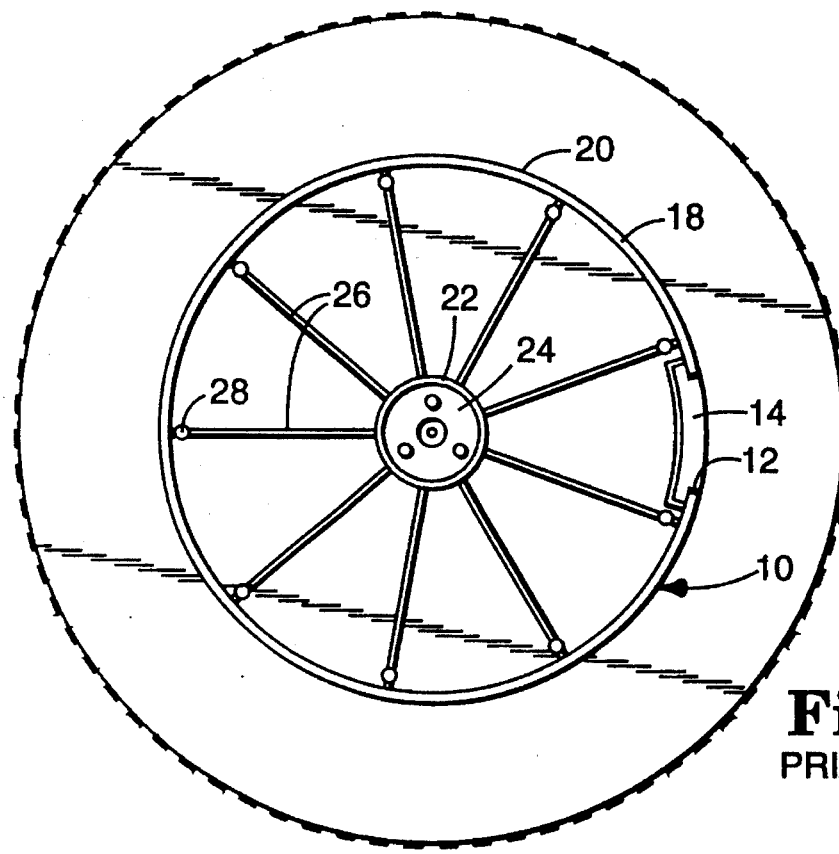
FIG. 1 is a top view of a known reel hub and lower flange of a reel.
Figure 2:
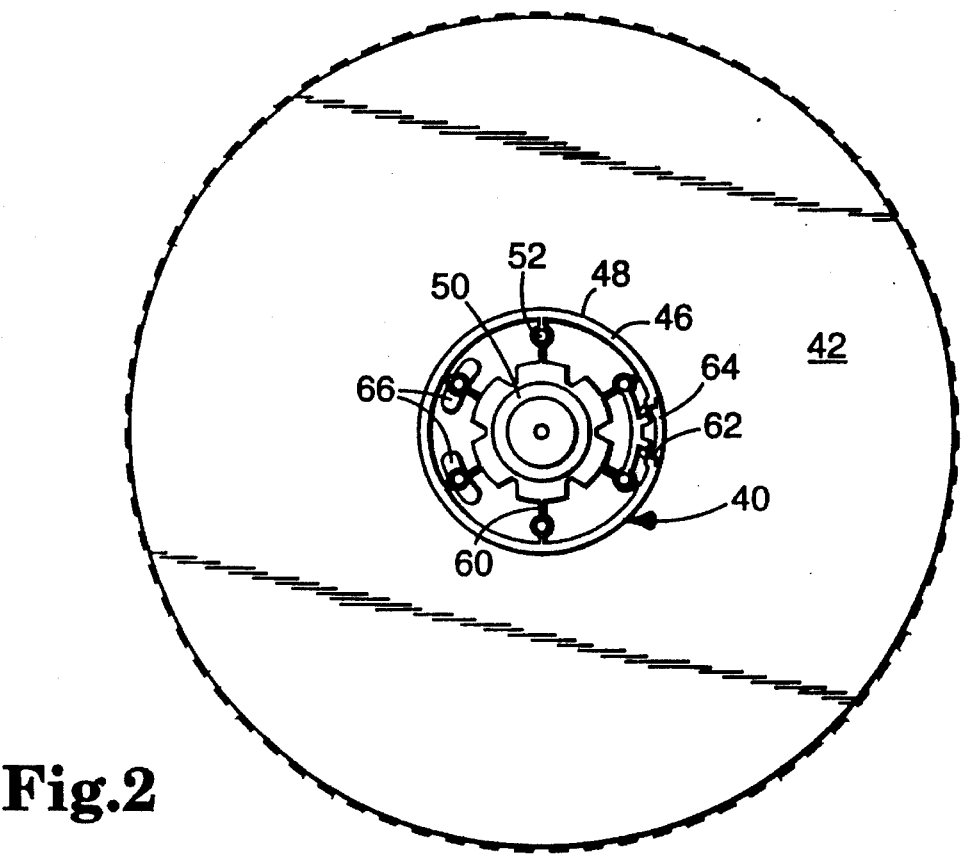
FIG. 2 is a top view of a reel hub and lower flange of a reel according to one embodiment of the present invention.
Figure 4:
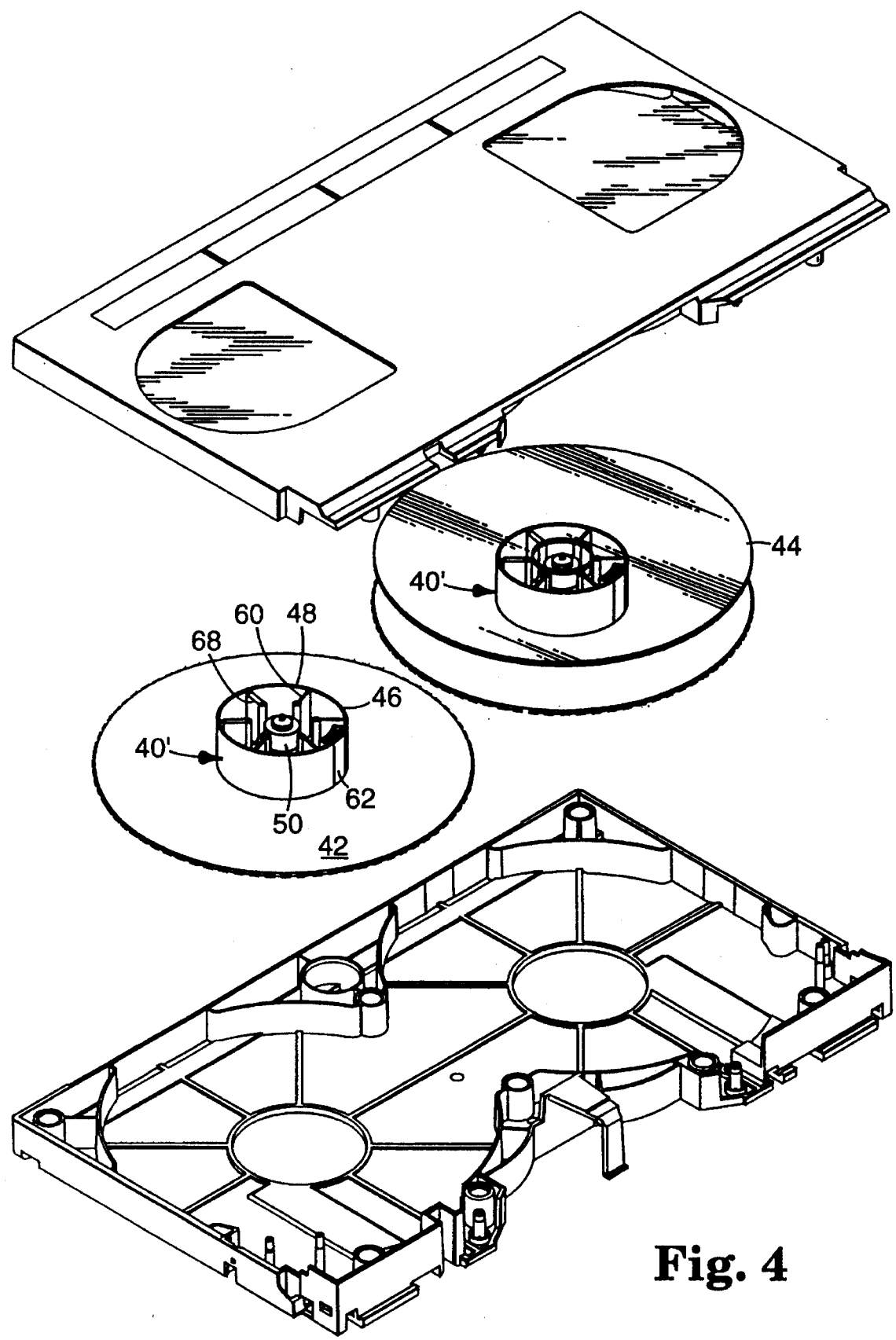
FIG. 4 is an exploded perspective view of a videocassette incorporating the reel hub of FIG. 2.
Figure 5:
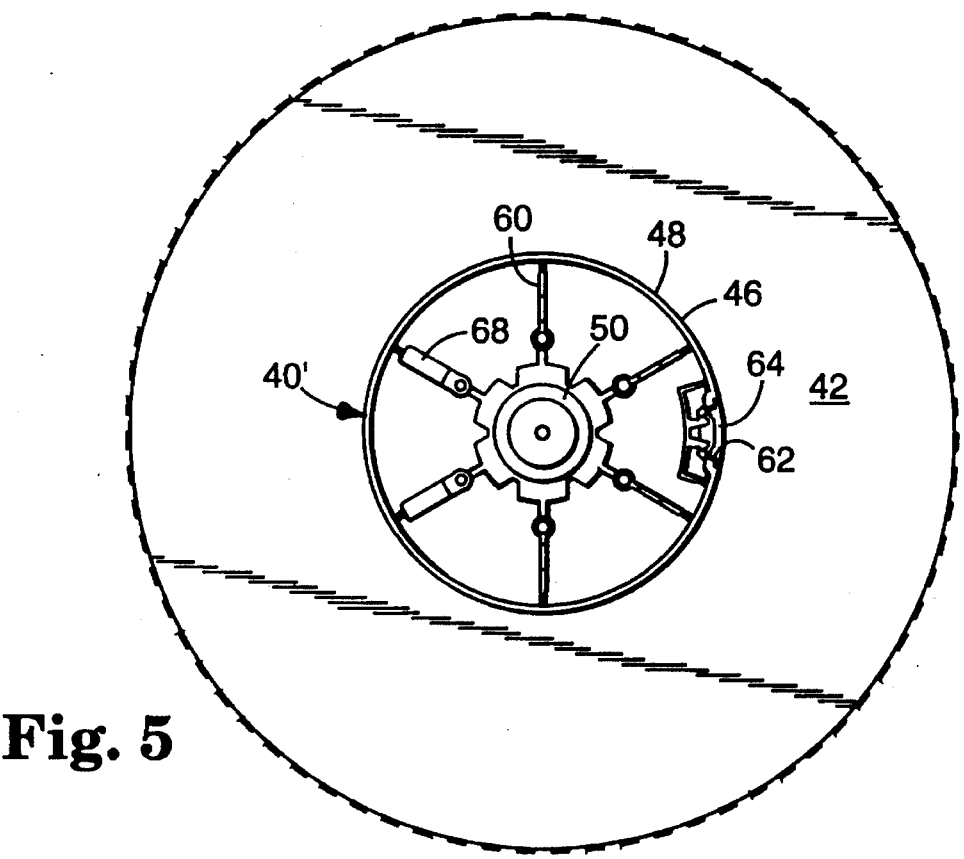
FIG. 5 is a top view of a reel hub and lower flange according to another embodiment of the present invention.

The videocassette reel hub shown in FIG. 2 is a Betacam Large SP long play reel hub of the present invention. The hub 40 is molded as one piece with a lower flange 42. An upper flange 44 (shown in FIG. 4) is molded separately and is attached to the hub 40. The hub 40 includes an outer cylinder 46, which has an outer surface which forms the tape winding surface 48, and an inner structure 50. The inner structure can be a concentrical inner cylinder or can be as shown in FIGS. 2 and 5. The outer cylinder 46 and inner structure 50 extend from the plane of the lower flange 42 at the bottom and have a top which is connected to the upper flange 44. The outer cylinder 46 is open at the top.

Figure 3:
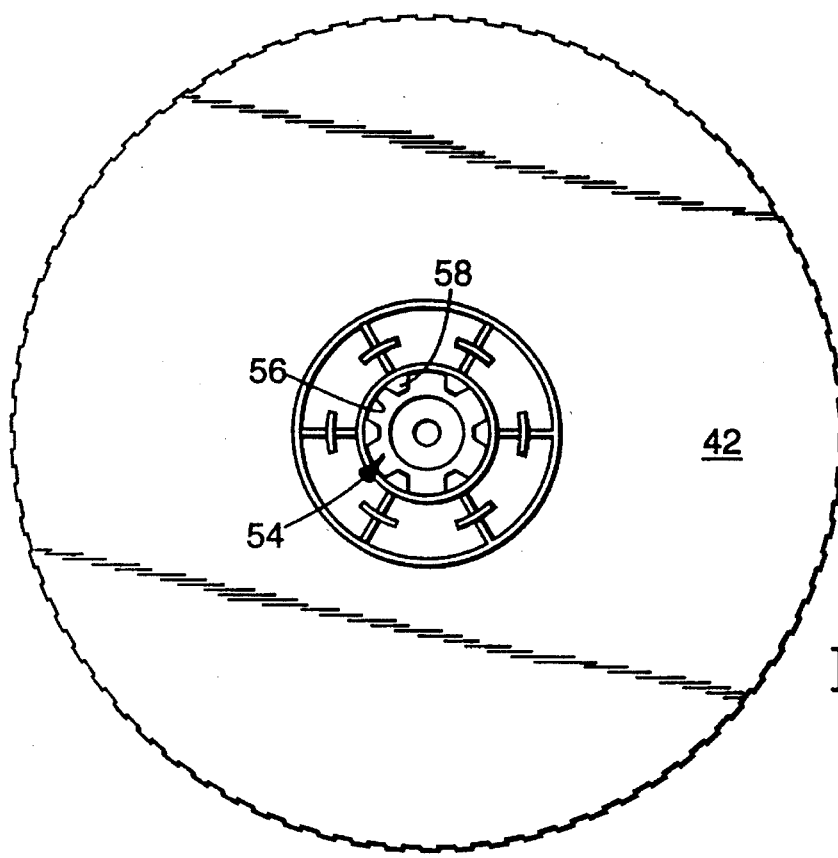
FIG. 3 is a bottom view of the reel hub and lower flange of FIG. 2.

The inner structure 50 can be closed at the top and can include protrusions 52 which aid in connecting the hub 40 to the upper flange 44. The inner structure 50 is open at the bottom to form a receptacle 54 for the VCR drive spindle, shown in FIG. 3. The inner surface 56 of the inner structure 50 can have splines 58 or other protrusions to engage the drive spindle.

As shown, a plurality of ribs 60 extends between the inner structure 50 and the outer cylinder 46 inside of the outer cylinder 46 for strength and to improve moldability. Any number, shape, and configuration of ribs 60 can be used providing an adequate connection between the inner structure 50 and the outer cylinder 46 is attained. Some embodiments can have no ribs for connecting the inner structure 50 and the outer cylinder 46. The protrusions 52 for attaching the upper flange 44 can be formed between the inner structure 50 and the outer cylinder 46, and can be molded as part of the ribs 60.

The outer cylinder 46 also has a lock for receiving the end of the tape. The lock includes an opening or receptacle 62 formed as a recessed portion of the outer cylinder 46 as part of the outer cylinder 46. The receptacle 62 is arc-shaped. The end of the tape is received in the receptacle 62 and a member, such as a clamp 64, which is complementarily shaped to the receptacle 62 is pushed into and is received in the receptacle 62 and fastens the tape to the reel hub 40 and complete the lock.

To balance the hub 40 and compensate for the increased mass of the hub 40 formed by the receptacle 62 and the clamp 64 and the heavier material used for the clamp 64, additional mass is formed as part of the hub 40 on the side of the hub 40 opposite the side having the tape clamp 64. This added mass is integrally molded as part of the hub 40. As shown in FIG. 2 in which ribs 60 are used, two of the ribs 60 have capsule-shaped balancing masses 66. These masses 66 can be centered on the rib 60 or not, depending on the placement of the ribs 60 and the desired location for the balancing mass. As shown, the balancing mass 66 has a major axis generally perpendicular to that of the rib. The amount and location of material is selected to balance the mass of the lock. This makes the overall center of mass and center of gravity of the reel coincident with the axis of rotation of the reel. The balancing material can be added as a single mass or as multiple masses to achieve coincident center of mass and axis of rotation.

In the embodiment of FIG. 5, which, for illustration, shows a Betacam videocassette short play reel hub 40', the balancing mass 68 is formed as a thicker portion of two of the ribs. This balancing mass 68 has a major axis generally coaxial and coextensive with that of the rib 60. In another alternative embodiment, where no ribs 60 are otherwise used to connect the inner structure and the outer cylinder 46, one or more ribs can be formed as the balancing mass, preferably at locations diametrically opposite the receptacle 62.

The configuration for the hub with balancing masses is selected to be easily moldable and keeps the thickness of the extra mass portions sufficiently low to avoid sink problems at the intersection of the hub and the lower flange.

A problem which frequently arises in molding thin walls intersected by thick ribs is that depressions, called sink marks, can form in the thin wall on the side opposite the rib intersection. The present invention avoids the formation of sink marks by thinning the balancing ribs in the region of intersection of the rib with the outer hub.

Various changes and modifications can be made in the invention without departing from the scope or spirit of the invention. For example, although the invention has been described with respect to Betacam format videocassettes, hub imbalance is a problem and can be resolved similarly in videocassettes of other formats such as the large D2 and D3 formats and the smaller VHS and 8 mm formats. Also, although the invention has been described using top and bottom to describe relative positions on the hub, these descriptions are illustrative only.

Unbalanced magnetic tape reels can be balanced in a variety of other ways which can involve the addition or removal of material in appropriate locations on the reel. For example, balancing can be achieved by removal of material at points on the reel flange located radially outward from the clamping area. This could be done by placing one or more holes in the reel flange, or by thinning a portion of the reel flange. Holes or other material removal would, however, risk causing warpage or other defects during injection molding, could have a detrimental effect upon the appearance of the reel, and could, during high speed winding, cause winding defects in the roll of tape, due to uneven removal of air from between the layers of tape as they are wound onto the reel.

Alternatively, it is possible to compensate for the unbalance produced by the mass of the clamp on one side of the hub by adding mass to the diametrically opposite side, by, for example, thickening the hub wall section in this area. However, the most economically feasible way to produce high quality cassette reels is injection molding of thermoplastic materials, and this process is subject to some limitations in producing parts having certain configurations. In particular, walls of varying thickness tend to exhibit dimensional variations and defects which might not occur in walls of constant thickness. This tends to diminish the desirability thickening of the hub wall for the purpose of reel balancing, at least in cases wherein the dimensional accuracy of the hub wall is critical, as it is in tape reels.

Additionally, other devices for balancing the reels can be used. The outer cylinder of the hub can be made thicker on the side opposite the receptacle and clamp. Also, one or both flanges on the side of the receptacle and clamp with the extra mass can be formed with thinner portions or with holes to reduce the mass, or one or both flanges on the side opposite the receptacle and clamp can be made thicker. These solutions can sometimes lead to distorted flanges or to uneven air escapement as tape is wound on the reel, which could cause winding difficulties and possible tape damage.

We claim:

1. A videocassette tape reel hub which is locatable between first and second flanges to form a reel, wherein the hub comprises:

an outer cylinder which has a top, a bottom, and an outer surface which forms a tape winding surface, which is extendable from the plane of the first flange at the bottom, and which is connectable to the second flange at the top, wherein the outer cylinder has a receptacle formed as a recessed portion of the outer surface as part of the outer cylinder, wherein the receptacle is adapted to receive a locking member to lock one end of tape to the hub, wherein when the locking member is received in the receptacle, the hub is inherently unbalanced, and wherein the hub is formed of a material having a different density than that of the locking member; and means, comprising one of increasing material and decreasing material, for compensating for the mass and weight of the receptacle and for the mass and weight of the locking member which would otherwise unbalance the hub, and for balancing the mass and weight of the hub to reduce wobble when the hub rotates.

2. The hub of claim 1 wherein the compensating and balancing means comprises a balancing mass formed inside the outer cylinder located on the side of the hub outer cylinder opposite the receptacle.

3. The hub of claim 2 further comprising an inner structure disposed within the outer cylinder which is extendable from the plane of the first flange at the bottom and has a top which is connectable to the second flange.

4. The hub of claim 3 wherein the outer cylinder is open at the top outside of the inner structure and is closed at the bottom outside of the inner structure.

5. The hub of claim 3 wherein the inner structure and the outer cylinder are concentric.

6. The hub of claim 3 wherein the inner structure is closed at the top and is open at the bottom to receive VCR drive spindles.

7. The hub of claim 3 further comprising at least one first rib extending between the inner structure and the outer cylinder inside of the outer cylinder; and at least one second rib extending between the inner structure and the outer cylinder inside of the outer cylinder; wherein the balancing mass is formed on at least one first rib.

8. The hub of claim 7 wherein the balancing mass is integrally molded as part of the first rib.

9. The hub of claim 7 wherein the balancing mass is capsule-shaped.

10. The hub of claim 9 wherein the balancing mass is centered on the first rib.

11. The hub of claim 10 wherein the balancing mass has a major axis generally perpendicular to that of the rib.

12. The hub of claim 7 wherein the balancing mass is formed as a thicker portion of the first rib and has a major axis generally coaxial with that of the rib.

13. The hub of claim 1 wherein the receptacle is arc-shaped.

14. The hub of claim 1 further comprising a clamp which serves as the locking member and is complementarily shaped to the receptacle and is receivable in the receptacle to fasten tape to the reel hub.

15. A videocassette tape reel comprising a cylindrical hub having first and second ends, and first and second flanges, each connected at a respective end of the hub, wherein the hub comprises:

an outer cylinder which has a top, a bottom, and an outer surface which forms a tape winding surface, which is extendable from the plane of the first flange at the bottom, and which is connectable to the second flange at the top, wherein the outer cylinder has a receptacle formed as a recessed portion of the outer surface as part of the outer cylinder, wherein the receptacle is adapted to receive a locking member to lock one end of tape to the hub, wherein when the locking member is received in the receptacle, the hub is inherently unbalanced, and wherein the hub is formed of a material having a different density than that of the locking member; and means, comprising one of increasing material and decreasing material, for compensating for the mass and weight of the receptacle and for the mass and weight of the locking member which would otherwise unbalance the hub, and for balancing the mass and weight of the hub to reduce wobble when the hub rotates.

16. The tape reel of claim 15 wherein the compensating and balancing means comprises a balancing mass formed inside the outer cylinder located on the side of the hub outer cylinder opposite the receptacle.

17. The tape reel of claim 16 further comprising an inner structure disposed within the outer cylinder which is extendable from the plane of the first flange at the bottom and has a top which is connectable to the second flange.

18. The tape reel of claim 17 further comprising at least one first rib extending between the inner structure and the outer cylinder inside of the outer cylinder; and at least one second rib extending between the inner structure and the outer cylinder inside of the outer cylinder; wherein the balancing mass is formed on at least one first rib.

19. A videocassette comprising a housing, a pair of tape reels, and a length of tape connected at each end to a respective tape reel, wherein at least one tape reel comprises a cylindrical hub having first and second ends, and first and second flanges, each connected at a respective end of the hub, and wherein the hub comprises:

an outer cylinder which has a top, a bottom, and an outer surface which forms a tape winding surface, which is extendable from the plane of the first flange at the bottom, and which is connectable to the second flange at the top, wherein the outer cylinder has a receptacle formed as a recessed portion of the outer surface as part of the outer cylinder, wherein the receptacle is adapted to receive a locking member to lock one end of tape to the hub, wherein when the locking member is received in the receptacle, the hub is inherently unbalanced, and wherein the hub is formed of a material having a different density than that of the locking member;

a locking member made of a material having a density different from that of the hub; and means, comprising one of increasing material and decreasing material, for compensating for the mass and weight of the receptacle and for the mass and weight of the locking member which would otherwise unbalance the hub, and for balancing the mass and weight of the hub to reduce wobble when the hub rotates.

20. The videocassette of claim 19 wherein the compensating and balancing means comprises a balancing mass formed inside the outer cylinder located on the side of the hub outer cylinder opposite the receptacle.

21. The videocassette of claim 20 further comprising an inner structure disposed within the outer cylinder which is extendable from the plane of the first flange at the bottom and has a top which is connectable to the second flange.

22. The videocassette of claim 21 further comprising at least one first rib extending between the inner structure and the outer cylinder inside of the outer cylinder; and at least one second rib extending between the inner structure and the outer cylinder inside of the outer cylinder; wherein the balancing mass is formed on at least one first rib.

* * * * *